United States Patent Office 2,926,133
Patented Feb. 23, 1960

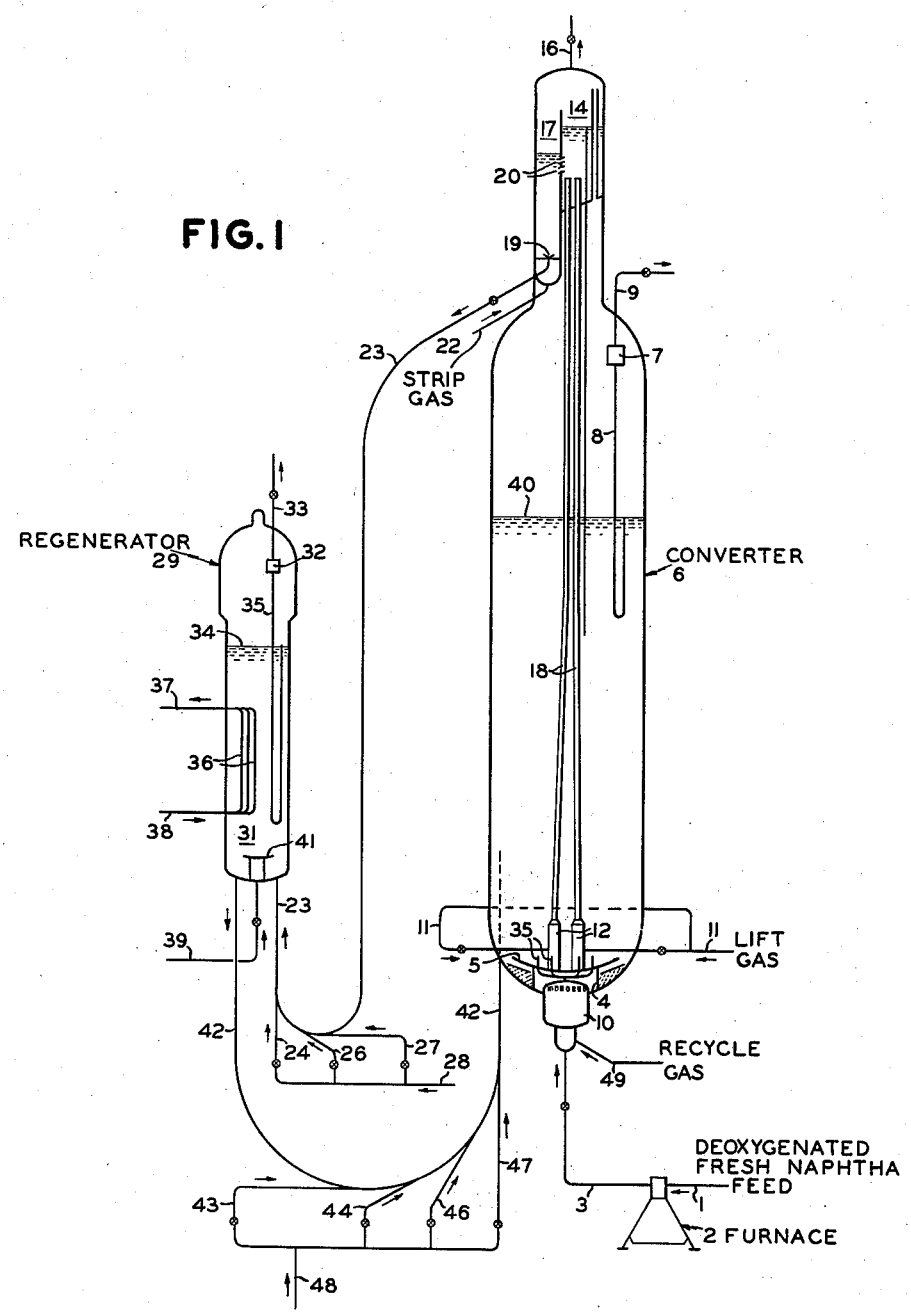

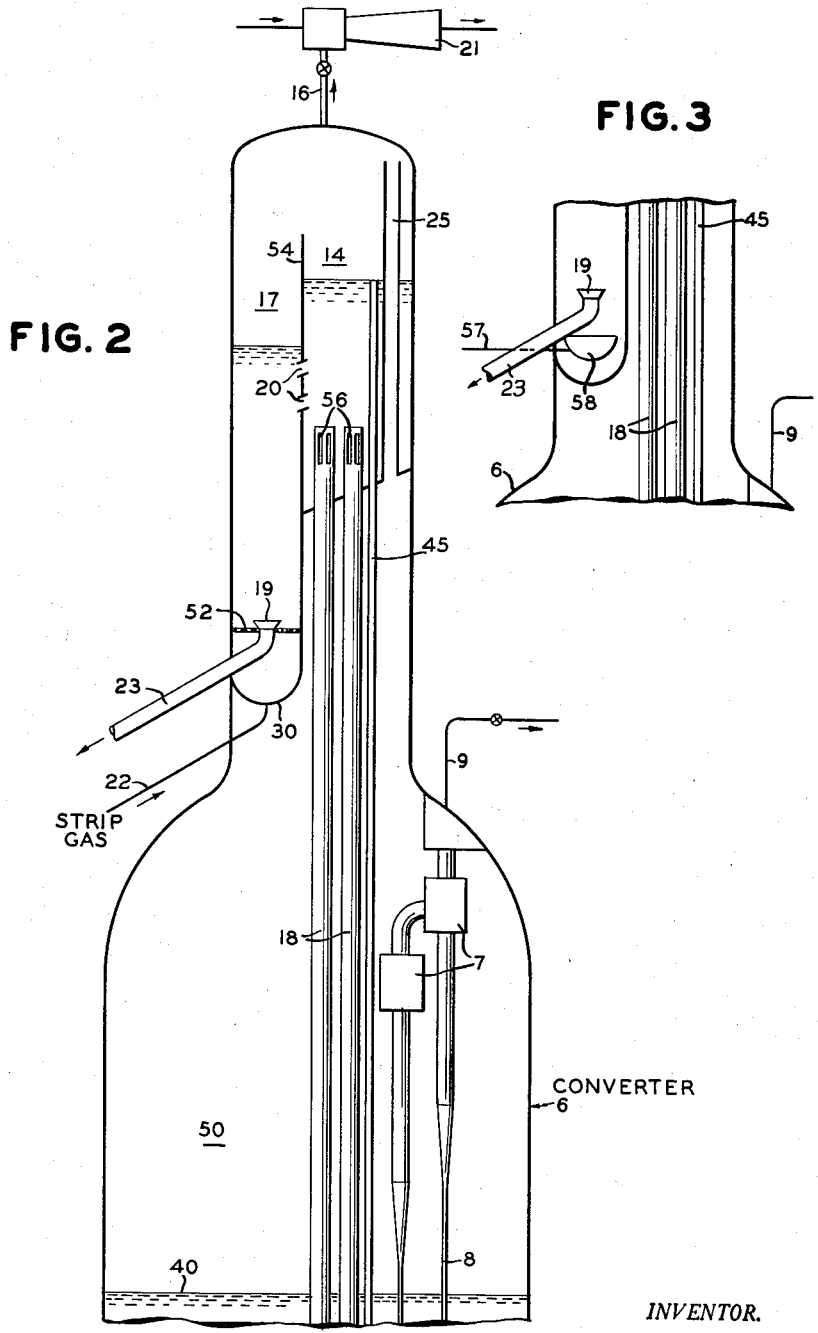

2,926,133

PROCESS AND APPARATUS FOR CONDUCTING CATALYTIC REACTIONS AND STRIPPING

William J. Degnen, Westfield, N.J., assignor to The M. W. Kellogg Company, Jersey City, N.J., a corporation of Delaware Application February 29, 1956, Serial No. 568,638

10 Claims. (Cl. 208—147)

This invention relates to an apparatus and conversion process employing finely divided fluidized contact material in a conversion zone. In one aspect, this invention relates to a method and means for maintaining contact material fluidized in a stripping zone. In another aspect, this invention relates to a method and means for removing fluidized contact material from a stripping zone. Although the invention is described with respect to a hydroforming process, in its broadest aspect the invention is applicable to any conversion process wherein a reactant is contacted with a fluidized bed of contact material and the contaminated contact material is passed to a stripping zone.

It is known that catalytic hydroforming of petroleum naphthas with a fluidized finely divided hydroforming catalyst such as a molybdena-alumina catalyst will upgrade and produce cyclic compounds of a higher octane rating under suitable operating conditions. Generally, the hydroforming of petroleum naphthas to produce cyclic compounds of a higher octane rating is carried out at a temperature of 875 to 1000° F. and a pressure of 50 to 500 pounds per square inch gauge. The naphtha feed is preheated to a temperature of approximately 950° F. below which thermal cracking of the feed takes place prior to entering the reactor. The preheated feed imparts approximately 20 percent of the endothermic heat of reaction with approximately 50 percent being furnished by recycle gases and approximately 30 percent furnished by hot finely divided catalyst from a regeneration zone. Contaminated catalyst obtained in the reaction zone, containing carbonaceous deposits and products of the reaction is removed from the reaction zone and sent to a stripping zone, where the finely divided catalyst is stripped with an inert gas for removal of products of reaction. Difficulty has arisen in preventing the finely divided contact material in the stripping zone from balling-up or agglomerating thus preventing uniform withdrawal of finely divided contact material therefrom.

An object of this invention is to provide an improved method and apparatus for handling fluidized contact material in a stripping zone.

A second object of this invention is to provide means for maintaining finely divided contact material in a stripping zone uniformly fluidized.

Another object of this invention is to prevent contaminated contact material from balling-up and defluidizing within a stripping zone.

Still another object of this invention is to provide means for withdrawing finely divided contact material from a stripping zone.

Yet another object is to provide an integral piece of equipment for carrying out a chemical reaction with finely divided contact material and for stripping the contact material before it is passed to a separate regeneration zone.

Another object is to provide a new and useful hydroformer reaction vessel.

Another object is to provide a method and apparatus for transferring finely divided contact material from a fluidized bed thereof to a stripping zone.

Various other objects and advantages will become apparent to those skilled in the art from the accompanying description and disclosure.

According to this invention, reaction vapors are introduced into the bottom of an enlarged and elongated vertical reaction zone and passes upwardly therethrough at an appropriate linear gas velocity of about 0.1 to about 5 feet per second to maintain a mass of finely divided contact material therein as a fluidized pseudo-liquid bed. Superimposed above and integral with said reaction zone is positioned an accumulation zone having adjacent thereto and in open communication therewith a stripping zone. The aforesaid accumulation zone and stripping zone are positioned within the same elongated vessel as the reaction zone which is unitary and integral therewith.

In the reaction zone, the contact material becomes contaminated with carbonaceous deposits due to the chemical reaction being effected therein, and as a result thereof, it is regenerated in a separate regeneration zone also in a fluidized condition. After regeneration, the contact material is returned to the reaction zone.

In order to effect the cyclic process of reaction and regeneration with the contact material, the finely divided contact material is passed from the bottom of the fluidized bed of contact material in the reaction zone by means of a gas lift upwardly into the aforesaid accumulation zone. In the accumulation zone, the spent contact material separates into a fluidized dense phase bed. The density of the contact material in the settling zone is somewhat greater than the reaction zone in order to aid in the removal of occluded products and reactant therefrom. The partially settled contact material in said accumulation zone is then passed to the adjacent stripping zone which is a unitary integral part of the reaction vessel through openings or elongated slots in a partition separating the accumulation zone from the stripping zone. The openings or elongated slots are approximately halfway up the vertical partition and above the catalyst inlet to the accumulation zone. The stripping zone is an elongated zone in which the contact material is contacted or stripped with suitable stripping gas, such as recycle gas or steam. The stripped contact material is withdrawn from the lower portion in a downwardly direction either vertically or angularly to the regeneration zone. The conduit for removal of the stripped contact material from the lower portion of the stripping zone is located near the bottom of the stripping zone and concentric with its vertical axis. The stripping gas is injected into the stripping zone below the entrance to the withdrawal conduit. In this way the contact material is maintained in a substantially fluidized pseudo-liquid condition up to the time that it actually enters the withdrawal conduit. Preferably a dispensing or dispersion means such as a perforated or foraminous partition contiguous with the walls of the stripping zone is provided for distributing the stripping gas below the entrance to the withdrawal conduit to assure uniform distribution of the stripping gases into the stripping zone and around the withdrawal conduit. A sufficient amount of stripping gas is introduced into the stripping zone to maintain a linear gas velocity therein of between about 0.1 and about 2 feet per second.

The upper portion of the stripping zone and accumulation zone are in open communication, and the stripping gases and occluded gases are combined and are withdrawn through a conduit communicating with the upper section of the reactor along with the lift gas from the accumulator section.

In past operations the location of the entrance of the stripping gas relative to the withdrawal conduit and stripping zone had proved unsatisfactory for several reasons. In one such unsuccessful embodiment, the withdrawal conduit was located at the bottom of the stripping zone, and the gases were introduced above the withdrawal conduit. This embodiment was unsuccessful, since the catalyst became deaerated before it was withdrawn. Some bridging and agglomeration of the contact material was noted across the withdrawal conduit outlet as a result of deaeration of the contact material. Prolonged hold-up of contact material in this section also resulted in increased carbon build-up of contact material. The present method and location of elements overcomes this difficulty entirely.

In the preferred embodiment, the invention relates to a stripping gas distributing device in the bottom of a vertically elongated stripping zone. The distributing device or apparatus comprises a perforated grid contiguous with the walls of the stripping zone containing a conduit concentrically located therein and extending a short distance above the grid for withdrawal of stripped contact material from the dense fluidized bed of contact material. Positioned below the stripping gas distributing grid is means for introducing stripping gas to the bottom of the stripping zone. This method and apparatus for introducing stripping gases to the bottom of the fluidized bed of the contact material prevents the contact material from balling-up or agglomerating and restricting the withdrawal of contact material from the dense fluidized bed. In addition, this method and apparatus for introducing reactants to the fluid bed of contact material more completely and uniformly strips the contact material of reaction products prior to removal from the stripping zone.

The present invention may be best understood and described by reference to the accompanying drawings which show the inventive features of the present invention as applied to the hydroforming of naphthas to produce cyclic compounds and removal of products of reaction from the contact material.

Figure 1 of the drawings is a diagrammatic cross-sectional illustration in elevation of an arrangement of apparatus for the hydroforming of naphthas including a reaction zone, an accumulation zone and a stripping zone.

Figure 2 is an enlarged cross-sectional view of the stripping zone and accumulation zone of Figure 1 for removal of products of reaction from the contaminated catalyst and means for withdrawal of stripped contact material from the bottom of the stripping zone.

Figure 3 is a cross-sectional view of another embodiment for introducing stripping gas and removal of stripped contact material from the bottom of the stripping zone of Figures 1 and 2.

Referring to Figure 1, a fresh naphtha feed fraction having a molecular weight of 109.0 and 55.0 A.P.I. gravity is introduced through a conduit 1 to a conventional preheating furnace 2 wherein the naphtha is preheated to a temperature of approximately 1000° F. The preheated feed is then passed to a conduit 3 into the bottom of a vertical elongated cylindrical reaction zone 6 at a rate of about 190,640 pounds per hour to a reactant distributing means 35 for introducing the preheated feed into the fluidized bed of contact material. Preheated recycle gases, at a temperature of approximately 1150° F., are introduced through conduit 49 to a cylindrical chamber in the bottom of reaction zone 6 beneath distributing plate 5 which distributes recycle gases throughout the bottom of the fluidized bed of contact material. A portion of these recycle gases pass through an annular zone of restricted cross-sectional area formed by a circular dish-shaped plate 5 and the bottom of the reaction zone outwardly and upwardly along the reactor walls 6 of the conversion zone. The recycle gas and fresh feed commingle in the dense fluidized contact material above the recycle gas circular dish-shaped distributing plate 5 and reactant inlet means 35 and pass upwardly through finely divided contact material at a gas velocity appropriate to form a dense pseudo-liquid phase of fluidized contact material with an upper more dilute phase of contact material wherein a portion of the contact material is separated from the reactant vapors and falls back into the dense phase and the reactant vapors then pass through conventional cyclone separators 7 wherein the catalyst fines are removed from the reaction products and returned to the dense fluidized bed of contact material through dipleg 8 with the reaction products removed from converter 6 through conduit 9. The reaction products having a molecular weight of approximately 19.9 and at a temperature of about 915° F. are removed from the reaction zone 6 through conduit 9 at a rate of approximately 170,000 pounds per hour. A portion of the spent contact material in the bottom of the reaction zone 6 is lifted as a relatively dilute catalyst phase in standpipes 18 by lift gas such as recycle gas or superheated steam, introduced through conduit 11 at a rate of approximately 7400 pounds per hour. The lift gas having a molecular weight of approximately 11.3 is preheated to a temperature of approximately 1100° F. and conveys contaminated contact material from the bottom of the vertical elongated reaction zone 6 upwardly through lift lines or conduits 18 to an accumulation zone 14 superimposed thereabove the reaction zone wherein the contact material is separated from the lift gas in a dense fluidized phase condition. The contact material, at a temperature of approximately 900° F. is then transferred to stripping zone 17 adjacent thereto through suitable slots or elongated openings 20 in the wall therebetween. Superheated steam or recycle gas introduced into the bottom of stripping zone 17 below distributing grid 52 at a temperature of approximately 1100° F. maintains the contact material above the grid in a dense pseudo-liquid fluidized condition to facilitate stripping of the reaction products from the contaminated contact material and provides for a more uniform withdrawal of the contact material from the stripping zone through withdrawal conduit inlet 19 centrally located and extending a short distance (1 to 6 inches) above the distributing grid 52. Stripping gases along with lift gases are removed from the top of the stripping and accumulation zones through conduit 25 in open communication with the top of the reaction zone, commingled with the reaction products, passed through cyclone separator 7 and removed from the reactor by conduit 9. Conduit 16 and aspirator 21 are used primarily during start-up of the reactor. The contact material is then transferred through conduit 23 to a vertically elongated regeneration zone 29. Steam or recycle gas may be introduced to conduits 28, 27, 26 or 24 to assist in transfer of the contact material in conduit 23 to regeneration zone 29. Contaminated contact material is removed from stripping zone 17 through conduit 23 at a rate of approximately 192,000 pounds per hour. Regeneration gases are introduced into the bottom of vertically elongated regenerator 29 through conduit 39 into a regeneration gas distributing chamber 41 which may be similar in design to the distributing chamber used in the bottom of converter 6 for directing and distributing regeneration gases uniformly throughout the bottom of the dense fluidized bed of contact material therein. Cooler 36 submerged in the dense pseudo-liquid fluidized bed of contact material in the regeneration zone 29 comprising coolant inlet conduit 38 and outlet conduit 37 provides means for controlling the regeneration temperature within the desired range during combustion of carbonaceous deposits and other contaminants on the fluidized contact material. Regeneration gases containing controlled amounts of oxygen introduced through conduit 39 removes carbonaceous deposits from the contact material in the regeneration zone. The products of combustion are separated from the contact material in a dilute phase superimposed above the dense phase of contact material in the regeneration zone. The hot products of regeneration are then removed through conventional cyclone separators 32 and removed from the regeneration zone 29 through conduit 33. The regenerated contact material is withdrawn from the bottom of the dense fluidized bed of contact material in the regeneration zone by conduit 42 at a rate of approximately 191,000 pounds per hour and transferred to the bottom of reaction zone 6. Air or recycle gas may be introduced through conduits 48, 43, 44, 46 and 47 to assist in transferring the regenerated contact material in conduit 42 to reaction zone 6.

According to one embodiment of the present invention, as shown by Figures 1 and 2, a unitary and integrated vessel is provided containing an accumulation zone and a stripping zone in the upper portion of the vessel of smaller diameter with the reaction zone in the lower portion thereof. The advantages of such a unitary vessel are many-fold, in that, it is simple and economical to manufacture by elimination of elaborate inter-connecting conduits and supporting structure, provides a system of minimum heat loss, and provides a system for transfer of fluidized contact material through a plurality of interconnecting zones with a minimum of transfer equipment. Since the flow of the finely divided catalyst material throughout the several contacting zones is basically a function of the differential in pressure due to catalyst head, the unitary system of the present invention takes maximum advantage of this basic principle to transfer the catalyst from one zone to another. By reducing the head in the catalyst lift lines, with lift gas, for transferring the catalyst from the bottom of the reaction zone to the accumulation zone positioned above the reaction zone, a minimum of auxiliary equipment is required to maintain catalyst flow through a plurality of contact zones.

In accordance with the present invention, the essential features are more specifically defined by referring to Figure 2 which shows diagrammatically, in cross-section, the apparatus for stripping reaction products from the contaminated contact material in a stripping zone. More specifically, Figure 2 shows the top portion of a vertically elongated cylindrical reaction zone 6 of smaller diameter in cross-section than the reaction chamber therebelow which is divided in its lower portion by a vertical baffle 54 containing slots or elongated openings 20 forming two vertical elongated catalyst-containing zones 14 and 17 which are in open communication with one another in the top part of the cylindrical zone. Conduits 18 provide means for transporting contaminated catalyst or contact material by lift gases such as recycle gases or superheated steam, from the lower portion of reaction zone 6 vertically upwardly through the reactor into the bottom of accumulating zone 14 wherein contact material is separated from the lift gases and maintained in a dense pseudo-liquid fluidized condition. Undesirable large particles of contact material settle to the bottom of accumulating zone 14 and can be withdrawn therefrom through means not shown. The contaminated contact material in accumulating zone 14 is transferred to stripping zone 17 through perforations or elongated slots 20 contained in vertical baffle or plate 54 to a vertical elongated stripping chamber 17 adjacent thereto. The perforations or elongated slots are located approximately halfway up the vertical baffle and above the contact material inlet to the bottom of the accumulation zone. The height of the dense fluidized bed of contact material in accumulating zone 14 is controlled by an overflow pipe 25 which provides means for the contact material to return to the reaction zone in the event an excess of contact material above the desired level is acquired therein. Such a condition could arise from transferring contaminated contact material through vertical riser 18 at a higher rate than the material is removed from the settling and the stripping zone. During operation the top of the dense fluidized bed of contact material in the stripping zone is generally below the top of the bed in the accumulation zone. The contaminated contact material in stripping zone 17 is uniformly stripped of its reaction products by stripping gas such as steam or recycle gases introduced to the bottom of zone 17 through conduit 22 prior to removal of the contact material from the stripping zone. Stripping medium introduced through conduit 22 to the hemispherical bottom portion of stripping zone 17 is directed upwardly and uniformly through the contact material by perforated distributing grid 52 thereabove. Distributing grid 52 may be a perforated steel plate or screen contiguous with the walls of the stripping zone which will effectively distribute the stripping medium throughout the cross-section of the stripping zone. Conduit 23 which has an inlet 19, which may be but not necessarily funnel-shaped, concentrically located within stripping zone 17, is shown sloping downwardly and outwardly from the stripping zone at an angle of 30 degrees from the horizontal plane. It may also be arranged to be taken vertically downward through the reaction zone. The inlet of the withdrawal conduit 23 so positioned above the stripping gas distributing means provides an optimum arrangement for withdrawing the stripped contact material uniformly from the bottom of the stripping zone 17. Inlet 19 concentrically located within grid 20 extends vertically upward above the grid for a short distance, usually 1 to 6 inches. Stripping gases, such as steam, or recycle gases, introduced into the bottom of stripping zone 17 at a velocity of about 0.1 to 2 feet per second maintains the contact material above grid 52 in a dense pseudo-liquid fluidized condition wherein volatile contaminants are uniformly stripped from the contact material in such a manner as to prevent balling-up or agglomeration of the contact material in the stripping zone thereby maintaining the material in a finely divided dense dispersed condition for uniform and uninterrupted withdrawal from the bottom of the stripping zone through inlet 19 and conduit 23. The stripped contact material in conduit 23 is then transferred to regeneration zone 29 as discussed hereinabove.

Figure 3 represents a second embodiment of the present invention for introducing stripping gases and removal of stripped contact material from the bottom of a stripping zone which is a unitary part of the reaction vessel of Figure 1. Stripping gases are introduced through conduit 57 into a distributing pot 58 which directs the stripping gases upwardly and around withdrawal conduit 23 to maintain the contact material fluidized thereabove whereby the contaminated contact material is stripped of its occluded reaction products and a portion of the stripped fluidized contact material is then withdrawn from the bottom of the stripping zone through inlet 19 of withdrawal conduit 23 concentrically located within the stripping zone which is shown directed downwardly and outwardly from the stripping zone at an angle of 30 degrees from a horizontal plane. This embodiment provides an arrangement of apparatus for removing stripped contact material from the bottom of the stripping zone contained in the unitary apparatus described hereinabove. The remaining portion of the apparatus of Figure 3, not shown, is similar in design to that shown in Figure 2.

EXAMPLE 1

The basic design of a fluid hydroformer was set by the overall requirement for a high quality aviation gasoline blending stock. In order to produce the required aviation blending material, it was necessary to reform a select, narrow boiling range (224/272° F.) naphtha at a high severity; that is, to approximately 95 clear research octane on the $C_5$ to end point hydroformate. Run I with the fluid hydroformer was continued for 42 days. Although acceptable products were made during most of this period, the operation of the unit was considered generally unsatisfactory. Inspection of the unit after shut-down revealed that about ten tons of hard, black deposit (analysis showed as high as 90 percent carbon) was found in the form of a layer around the outer edge of the reactor grid. To circumvent this problem, improved recycle gas distribution was provided, as shown by Figure 2, at the outer edge of the grid to prevent stagnation in the zone where the coke deposit had formed. This modification provided additional advantages to the extent that is prevented the catalyst from defluidizing at the reactor walls and provided a more uniform temperature throughout the catalyst bed at the reactant inlet with lessening of the attendant hydrocracking on the stagnant zone which results in a considerable rise in temperature due to exothermic reactions. Run II was started and continued with excellent success. As the carbon and sulfur content of the catalyst was lowered to reasonable levels, attributed to good catalyst circulation, the effective activity of the catalyst improved. After 120 days of operation, the difficulties experienced in run I had been eliminated and aviation gasoline of the desired octane rating was continuously produced.

Table I

|  | Operating Conditions—Run II | | | | |
| --- | --- | --- | --- | --- | --- |
| No. Day | 8 | 15 | 15 | 15 | 6 |
| Feed Rate, b.p.d | 17,570 | 17,790 | 18,300 | 18,880 | 18,550 |
| Reactor Temp., ° F | 918 | 920 | 911 | 908 | 906 |
| Cat. to Oil Ratio | 0.87 | 0.75 | 0.84 | 0.74 | 0.77 |
| Space Velocity, w./hr./w | 0.34 | 0.35 | 0.34 | 0.35 | 0.33 |
| Reactor Pressure, p.s.i.g | 225 | 225 | 225 | 225 | 225 |
| $C_5$+Hydroformate Oct., F-1 (clear) | 93.4 | 92.2 | 92.0 | 90.9 | 90.6 |
| Recycle Gas, s.c.f./b | 5,480 | 5,410 | 5,330 | 5,160 | 5,160 |
| Mol percent $H_2$ | 67.5 | 64.0 | 66.1 | 66.6 | 66.2 |
| Rec. Gas Furnace Out, ° F | 1,154 | 1,171 | 1,157 | 1,152 | 1,148 |
| Naphtha Furnace Out, ° F | 961 | 962 | 951 | 947 | 936 |
| Carbon on Cat., Wt. Percent: | | | | | |
| Spent | 0.59 | 0.70 | 0.66 | 0.74 | 0.71 |
| Regenerated | 0.02 | 0.03 | 0.04 | 0.06 | 0.05 |
| Sulfur on Spent Cat., Wt. Percent | 0.05 | 0.07 | 0.07 | 0.10 | 0.04 |
| Reactor Bed Height, Ft.[1] | 46.5 | 45.0 | 46.0 | 44.5 | 45.5 |
| Catalyst Holdup, M lbs.: | | | | | |
| Reactor | 571.0 | 563.0 | 594.0 | 592.0 | 616.0 |
| Regenerator | 10.3 | 11.9 | 9.8 | 10.0 | 16.4 |
| Total [2] | 601.3 | 594.9 | 623.8 | 622.0 | 652.4 |
| Reactor Density, #/ft.³ | 43 | 44 | 46 | 47 | 48 |
| Regenerator Holdup Time, Min | 3.68 | 4.89 | 3.48 | 3.89 | 6.23 |
| Cat. Circulation, #/hr | 168,000 | 146,000 | 169,000 | 154,000 | 158,000 |
| Regen. Temp., ° F | 1,097 | 1,109 | 1,084 | 1,107 | 1,102 |
| Combustion Air, #/hr | 21,900 | 21,960 | 22,540 | 22,210 | 22,610 |
| Regen. Density, #/ft.³ | 22 | 18 | 19 | 19 | 25 |

[1] Feet above grid.
[2] 20,000# catalyst in lines, stripper and hopper (est.).

It is intended that all matter contained in the above detailed description or shown in the accompanying drawings shall be interpreted as illustrative and not in a limiting sense. Various modifications and alterations of the process and arrangement of apparatus of this invention may become apparent to those skilled in the art without departing from the scope of this invention. The theories and/or specific examples are offered as a means for better understanding of this invention and are not to be construed as unnecessarily limiting to the invention.

Having described my invention, I claim:

1. A vessel for effecting a chemical reaction in the presence of finely divided fluidized contact material and separation of reaction products therefrom, which comprises in combination an elongated upright cylindrical vessel, a partition separating said vessel into an upper chamber and a lower chamber, said upper chamber being of smaller diameter than said lower chamber, said upper chamber being divided into a settling chamber and a stripping chamber, said settling chamber and said stripping chamber being in open communication with one another in the upper portion thereof, means for passing contact material from said settling chamber to said stripping chamber, a first conduit extending downwardly through said settling chamber from a point below said transfer means to the lower portion of said lower chamber, means for introducing a fluid material into the lower portion of said first conduit, a second conduit extending downwardly through said settling chamber from a point above said transfer means to the lower portion of said lower chamber, a horizontal perforated partition below said transfer means and contiguous with the walls of said stripping chamber, a withdrawal conduit concentrically located within said stripping chamber and below said transfer means extending downwardly through said partition and outwardly through said vessel wall, means for introducing stripping gas to the lower portion of said stripping chamber below said perforated partition and means for removing reaction products from the upper portion of said lower chamber.

2. A unitary vessel for effecting a chemical reaction in the presence of finely divided fluidized contact material which comprises in combination a substantially vertical elongated reaction vessel, a baffle means separating said vessel into an upper chamber and a lower reaction chamber, said upper chamber being of smaller diameter than said reaction chamber, a settling chamber and a stripping chamber confined within the upper chamber of said vessel, said settling chamber and said stripping chamber being in open communication with one another in the upper portion thereof, means for transferring contact material from said settling chamber to said stripping chamber, a first conduit extending downwardly through said settling chamber from a point below said transfer means to the lower portion of said reaction chamber, means for introducing a gaseous material into the lower portion of said first conduit, a substantially horizontal perforated partition positioned below said transfer means and contiguous with the walls of said stripping chamber, a withdrawal conduit located within said stripping chamber and below said transfer means, means for introducing stripping gas to the lower portion of said stripping chamber below said perforated partition and means for passing stripped products of reaction and stripping gas to the upper portion of said reaction chamber.

3. A unitary vessel comprising in combination a reaction chamber for effecting contact of a reactant in the presence of finely divided fluidized contact material, an accumulator chamber and a stripping chamber for separation of occluded reaction products from finely divided contact material, said stripping chamber and said accumulator chamber in open communication with one another in the upper portion of said vessel and positioned above said reaction chamber, means for maintaining a dense fluidized bed of contact material in said reaction chamber, a first substantially vertical conduit in open communication with the lower portion of said reaction chamber and the lower portion of said accumulator chamber, means for introducing a gaseous material into the lower portion of said first conduit, a second substantially vertical conduit in open communication with the upper portion of said accumulator chamber extending downwardly into said dense fluidized bed of contact material in said reaction chamber, a third open end conduit extending downwardly from the upper portion of said accumulator chamber to the upper portion of said reaction chamber above said dense fluidized bed of contact material, means for passing contact material from said accumulator chamber to said stripping chamber, a foraminous partition substantially horizontal positioned in the lower portion of said stripping chamber, an open end funnel shaped conduit concentrically located in said foraminous partition extending downwardly through said partition and outwardly through the vessel wall below said partition at an angle of about 30 to about 45 degrees from the horizontal, means for introducing stripping gas to said stripping chamber below said partition, means for introducing reactants to the lower portion of said reaction chamber and means for removal of reaction products from the upper portion of said reaction chamber.

4. A unitary vessel for contacting finely divided fluidized contact material with a gaseous material which comprises in combination a vertical elongated vessel, a partition separating the upper portion of said vessel from the lower portion thereof, a substantially vertical baffle extending upwardly from said partition dividing the upper portion of said vessel above said partition into a settling chamber and a stripping chamber, the upper portion of said vessel being of smaller diameter than the lower portion of said vessel, said settling chamber and said stripping chamber being in open communication with one another in the upper portion thereof, means for maintaining a dense fluidized bed of contact material in the lower portion of said vessel forming a lower reaction chamber, means for transferring contact material from the lower portion of said reaction vessel to the lower portion of said settling chamber, means for returning contact material from the upper portion of said settling chamber to said dense fluidized bed, means for transferring contact material from said settling chamber to the upper portion of said stripping chamber comprising a plurality of openings in said vertical baffle separating said stripping chamber from said settling chamber, said openings located at a point above the point of introduction of contact material to said settling chamber, a withdrawal conduit for removing stripped contact material from the lower portion of said stripping chamber concentrically located within said stripping chamber, said withdrawal conduit encompassed by an annular perforated member contiguous with the walls of said stripping chamber, said withdrawal conduit extending downwardly through said perforated member and outwardly through the exterior wall of said vessel at an angle of about 60 to about 45 degrees from the vertical, means for introducing stripping gas to the lower portion of said stripping chamber at a point below said annular member, means for passing stripped products of reaction from said stripping chamber to the upper portion of said reaction chamber above the dense bed of contact material therein and means for withdrawal of reaction products from said vessel.

5. A unitary vessel for effecting contact between finely divided fluidized contact material and a gaseous material which comprises in combination an elongated substantially vertical cylindrical vessel, a partition separating the upper portion of said vessel from the lower portion thereof, a substantially vertical baffle extending upwardly from said partition dividing the upper portion of said vessel into a settling chamber and a stripping chamber, said upper portion of said vessel above said partition being of smaller diameter than the lower portion of said vessel, said stripping chamber and said settling chamber in open communication with one another in the upper portion thereof, means for maintaining a dense fluidized bed of contact material in the lower portion of said vessel forming a reaction chamber, means for introducing a reactant into the lower portion of said dense fluidized bed of material, means for passing contact material from said fluidized bed to said settling chamber, means for returning contact material from the upper portion of said settling chamber to said dense fluidized bed, means for transferring contact material from said settling chamber to said stripping chamber, said transfer means located at a point above the point of introduction of contact material to said settling chamber, a withdrawal conduit, means for passing stripped contact material from said stripping chamber to the inlet of said withdrawal conduit, said withdrawal conduit encompassed by an annular perforated member contiguous with the walls of said stripping chamber, means for introducing stripping gas to the lower portion of said stripping chamber and means for withdrawal of reaction products from said reaction vessel.

6. A unitary apparatus comprising in combination a substantially vertical elongated cylindrical vessel of smaller diameter in the upper portion thereof, a partition separating the upper portion of said vessel of smaller diameter from the lower portion of said vessel, a substantially vertical baffle extending upwardly from said partition forming a settling chamber and a stripping chamber in open communication with one another in the upper portion thereof, a plurality of spaced apart slots in said baffle substantially above the bottom thereof, a first open end conduit extending upwardly from the lower portion of said vessel into the lower portion of said settling chamber and terminating at a point below said spaced apart slots, means for introducing a fluid material into the lower portion of said first conduit, a second conduit extending downwardly from said settling chamber above said slot means to the lower portion of said vessel, a third open end conduit concentrically located within the lower portion of said stripping chamber originating at a point below said slot means and extending downwardly through a perforated partition in the lower portion of said stripping chamber, said third conduit extending downwardly and outwardly through said reaction vessel wall at an angle of about 30 to about 45 degrees from a horizontal plane and means for introducing stripping gas to the lower portion of said stripping chamber below said perforated partition.

7. A process for stripping contaminated catalyst obtained from a reaction zone which comprises passing vaporous reactants in contact with a dense fluidized mass of finely divided catalyst in a reaction zone thereby contaminating the catalyst with products of reaction, withdrawing a portion of said contaminated catalyst from the lower portion of said fluidized bed in said reaction zone and passing the same as a dilute catalyst phase in a gaseous material to an accumulation zone, separating contaminated catalyst from said gaseous material in said accumulation zone as a dense fluidized bed of catalyst, passing separated catalyst from the intermediate portion of said accumulation zone to the upper portion of a dense fluidized bed of catalyst in an adjacent stripping zone, said stripping zone, accumulation zone and reaction zone being in open communication with another in the upper portion thereof, introducing stripping gas into the lower portion of said stripping zone such that the stripping gas is uniformly distributed throughout the bed of catalyst in said stripping zone upon initial contact with said dense catalyst bed, passing uniformly distributed stripping gas upwardly through said stripping zone whereby the catalyst is maintained in a dense fluidized condition during said stripping operation, withdrawing a portion of said stripped catalyst from said dense fluidized catalyst bed at a point adjacent to but above the initial point of contact of said stripping gas with said catalyst, and withdrawing reaction products containing stripping gas from said reaction zone.

8. An integrated process for handling and stripping contaminated catalysts of occluded reaction products which comprises, passing a hydrocarbon reactant in contact with a fluidized bed of catalyst in a reaction zone thereby contaminating the catalyst with reaction products, withdrawing contaminated catalyst from the lower portion of said reaction zone and passing the same as a dilute suspension in a gaseous material upwardly to an accumulation zone, separating catalyst from said gaseous material in said accumulation zone as a fluidized bed of catalyst, passing separated catalyst from said accumulation zone to the upper portion of a dense fluidized bed of catalyst in a stripping zone, passing stripping gas to the lower portion of said stripping zone and uniformly distributing said stripping gas throughout the cross-section of said stripping zone in the lower portion thereof thereby fluidizing said catalyst in said stripping zone uniformly throughout its cross-section immediately upon contact with said stripping gas, passing said stripping gas upwardly through said stripping zone countercurrent to catalyst moving downwardly therein, withdrawing stripped fluidized catalyst from the lower portion of said stripping zone adjacent to the initial point of contact of said stripping gas with said catalyst, passing stripping gas containing products of reaction from the upper portion of said stripping zone to the upper portion of said reaction zone and withdrawing reaction products containing stripping gas from the upper portion of said reaction zone.

9. A process for handling finely divided solid catalyst particles in a plurality of zones comprising a reaction zone, an accumulation zone and a stripping zone which comprises contacting a vaporous hydrocarbon reactant material with fluidized finely divided solid catalyst particles in a reaction zone to effect a desired reaction thereby contaminating the particles with reaction products, passing a portion of said catalyst particles from the lower portion of said reaction zone into a zone of smaller cross-section than said reaction zone positioned in the lower portion thereof, passing catalyst particles from said zone of smaller cross-section with an inert gaseous material upwardly as a relatively dilute confined stream to said accumulation zone, separating said catalyst particles from said gaseous material in said accumulation zone as a dense fluidized bed of solid catalyst particles, passing particles from said accumulation zone to the upper portion of said stripping zone for downward flow therein countercurrent to a stream of stripping gas, passing stripping gas into the lower portion of said stripping zone and distributing said stripping gas uniformly across the cross-section of said stripping zone whereby catalyst particles introduced to said stripping zone are maintained in a more dense fluidized condition than the catalyst bed in said accumulation zone, stripping contaminants from said catalyst, withdrawing stripped catalyst particles from the lower portion of said fluidized bed at a point immediately adjacent to the initial point of contact of stripping gas with said particle, withdrawing stripping gas from the upper portion of said stripping zone, commingling said withdrawn stripping gas with said gaseous material separated in said accumulation zone, passing said commingled gases to the upper portion of said reaction zone and withdrawing said commingled gases with reaction products from said reaction zone.

10. In a process for the conversion of hydrocarbons in the presence of finely divided catalytic material in a conversion zone wherein the catalyst becomes contaminated with products of reaction and the reaction products are removed from the catalytic material by stripping, the improved method of operation which comprises forming a dilute suspension of contaminated catalyst in an inert gaseous material, passing said dilute suspension to the lower portion of a more dense phase catalytic separation zone, separating inert gaseous material from said suspended catalyst in said separation zone, passing catalyst from said separation zone above the point of introduction of said suspension to a separate stripping zone, stripping catalyst in said stripping zone in a dense fluidized condition by introducing stripping gas uniformly across the lower portion of said catalyst bed and passing the same upwardly through said catalyst bed, withdrawing stripped catalyst centrally from the lower portion of said dense fluidized catalyst bed and combining stripping gas containing stripped products of reaction and inert gaseous material separated from the catalyst in said separation zone with products of said hydrocarbon conversion.

References Cited in the file of this patent

UNITED STATES PATENTS

| 2,367,281 | Johnson | Jan. 16, 1945 |
| 2,412,152 | Huff | Dec. 3, 1946 |
| 2,439,582 | Scheineman | Apr. 13, 1948 |
| 2,558,194 | Orescan | June 26, 1951 |
| 2,621,113 | Alther | Dec. 9, 1952 |
| 2,671,102 | Jewell | Mar. 2, 1954 |
| 2,695,866 | McGrath | Nov. 30, 1954 |
| 2,741,581 | Conn | Apr. 10, 1956 |
| 2,541,186 | Anderson | Feb. 13, 1957 |